April 9, 1963   E. R. FITCH ETAL   3,084,567
SLACK ADJUSTER
Filed Dec. 1, 1959   2 Sheets-Sheet 1
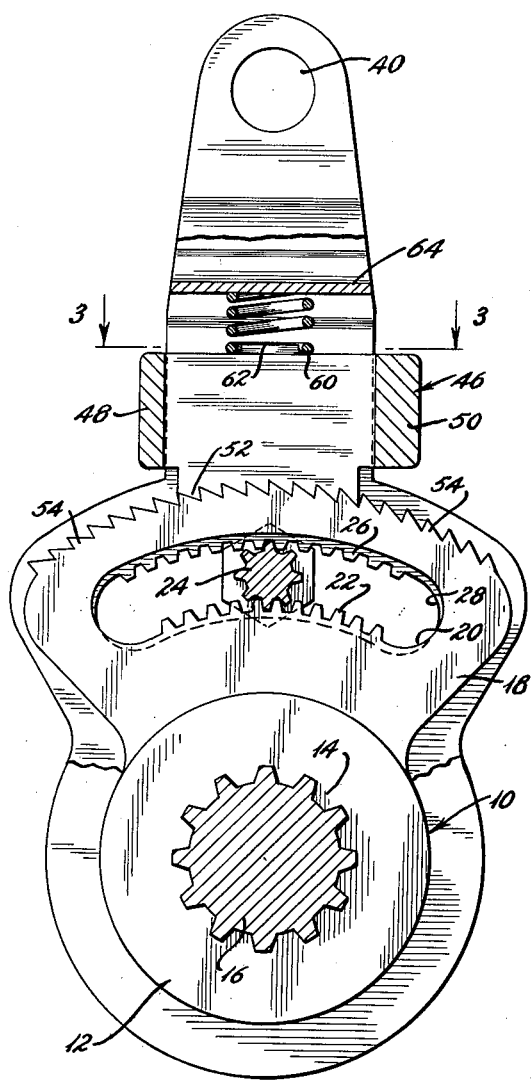
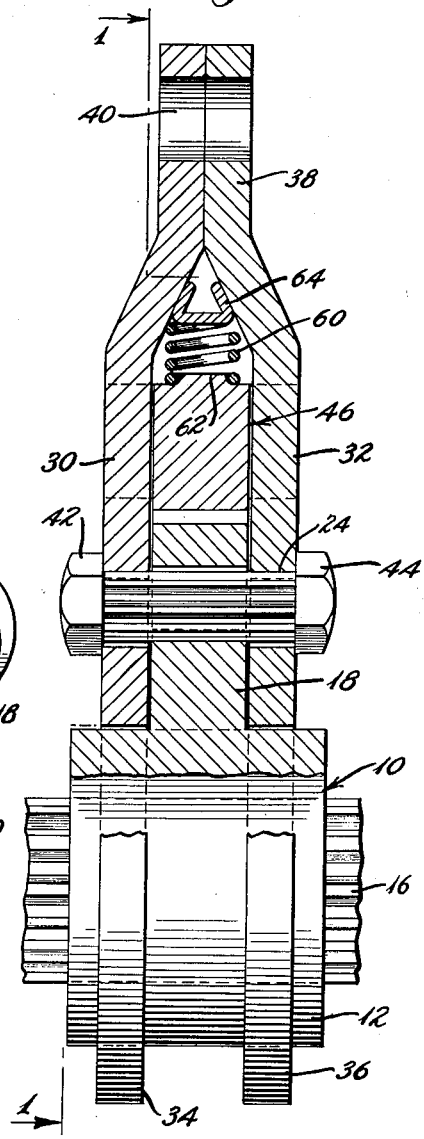
INVENTORS
Ellery R. Fitch &
William F. Klein
BY   Scrivener & Parker
ATTORNEYS April 9, 1963  E. R. FITCH ETAL  3,084,567
SLACK ADJUSTER
Filed Dec. 1, 1959  2 Sheets-Sheet 2
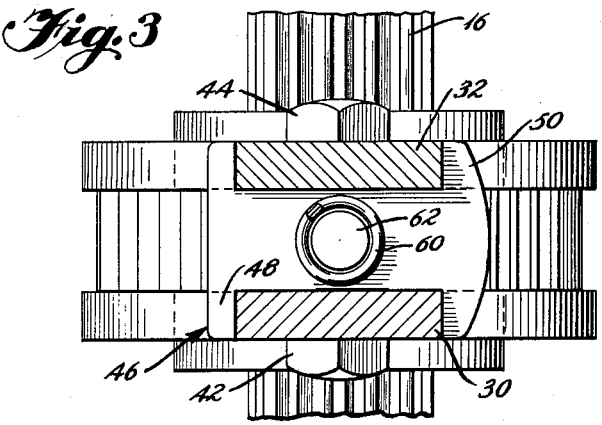
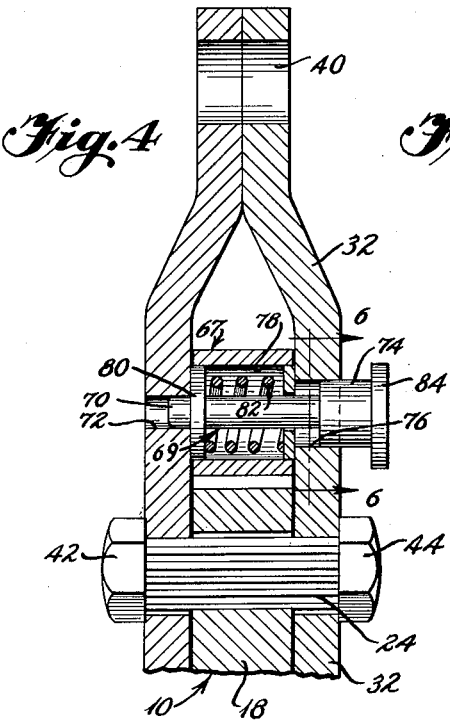
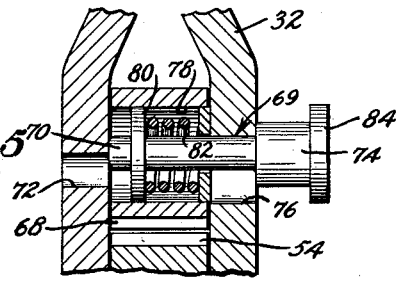
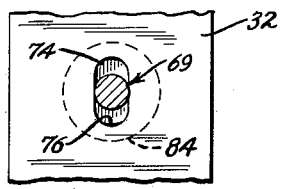
INVENTORS
Ellery R. Fitch &
William F. Klein
BY Scrivener & Parker
ATTORNEYS United States Patent Office 3,084,567
Patented Apr. 9, 1963

3,084,567
SLACK ADJUSTER
Ellery R. Fitch and William F. Klein, Elyria, Ohio, assignors to Bendix-Westinghouse Automotive Air Brake Company, Elyria, Ohio, a corporation of Delaware
Filed Dec. 1, 1959, Ser. No. 856,487
6 Claims. (Cl. 74—559)

This invention relates to slack adjusters for vehicle brakes and more particularly to an improved adjusting and locking means for slack adjusters.

One of the objects of the present invention is to provide a slack adjuster construction for vehicle brakes including a novel arrangement which permits a quick adjustment of the parts while insuring a locking thereof in the desired position of adjustment.

Another object of the invention is to provide an improved slack adjuster wherein the adjusting mechanism does not carry any of the braking load.

Another object of the invention is to provide an improved adjuster which is economical in construction in that it requires substantially no precision machining, has no bearings and requires no lubrication.

Other objects and their attendant advantages will become apparent as the following detailed description is read in conjunction with the accompanying drawings wherein:

FIG. 1 is a view taken substantially on the line 1—1 of FIG. 2 of an adjuster and locking means therefor constructed in accordance with the present invention;

FIG. 2 is a cross-sectional side view, partly in elevation, of the adjuster of FIG. 1;

FIG. 3 is a view taken substantially on the line 3—3 of FIG. 1;

FIG. 4 is a broken cross-sectional view of a second embodiment of the invention;

FIG. 5 is a cross-sectional view similar to FIG. 4 but showing the parts in changed position; and FIG. 6 is taken substantially on the line 6—6 of FIG. 4.

Referring to FIG. 1, a slack adjuster constructed in accordance with the present invention comprises a body part 10 having a cylindrical hub 12 provided with a series of internal splines 14 engageable with a splined brake operating camshaft 16. The body 10 has an upstanding central part 18 containing an arcuate slot 20 having a radius of curvature defined by the axis of the shaft 16. The lower surface of the arcuate slot is provided with a series of gear teeth 22 engaged by a pinion 24 which also engages teeth 26 provided in the upper side of slots 28 in a pair of arms 30, 32 which are laterally spaced to embrace the upstanding central part 18 of the body 10. The lower ends 34, 36 of the arms 30, 32 have openings therethrough which rotatably engage the cylindrical parts of the hub 12 which extend in either side of the central part 18. The upper ends of the arms 30, 32 are bent inwardly as shown and are integrally joined together as by welding or the like to constitute a brake lever 38, the upper end of which has an opening 40 for receiving the end of a suitable brake operating rod (not shown).

As shown in FIG. 2, the pinion 24 is elongated and extends outwardly of the arms 30, 32 with the outer ends of the pinion being provided with hexagonal heads 42, 44 which may be engaged by a suitable wrench to rotate the pinion and effect relative movement between the arms 30, 32 and the body member 10 with rotation of the pinion counterclockwise in FIG. 1 causing body 10 and hence shaft 16 to move clockwise in a slack take-up direction with respect to arms 30, 32.

In order to retain the shaft 16 in its adjusted position, the invention provides a novel latching arrangement in which a latch member 46 is slideable in the space between the arms 30, 32 and is provided with opposed end parts 48, 50 which extend across the side edges of the arms 30, 32 to retain the member 46 between the arms and to transfer the brake load to the shaft 16 in a manner that will become apparent. The lower edge of the latch member is provided with a series of ratchet teeth 52 engageable with a series of mating teeth 54 provided on the upper edge of the upper part 18 of the body member 10. The latch member 46 is urged downwardly by a spring 60 interposed between a boss 62 on the upper side of latch member 46 and a keeper member 64 which may be welded or otherwise secured between the arms 30, 32 as shown in FIG. 2. The spring 60 retains the respective teeth 52, 54 of the latch and body members mutually engaged but enables the body member to move clockwise in FIG. 1 relative to the arms with the teeth 54 acting on the teeth 52 to cam the latch member upwardly, the spring immediately thereafter moving the cam downwardly so that the teeth again mutually engage in ratchet fashion to prevent reverse movement of the body relative to the arms. In order to effect such reverse movement, it will be apparent that the latch member must be moved upwardly by suitable external means so that the teeth thereof are entirely clear of the teeth of the body member 10.

FIGS. 4 through 6 illustrate another means for latching the body 10 with respect to the arms 30, 32. Instead of the latch comprising a freely slideable member 46 which is cammed upwardly against spring pressure in ratchet fashion when the body member is moved in one direction, the latching means of FIGS. 4 through 6 comprises a body member 67 having locking teeth 68 on the bottom thereof, similar to the teeth 52 of FIG. 1, but the member 67 is normally locked against upward movement by a spring loaded lockshaft 69 having an end portion 70 engageable with a hole 72 in one arm and having a shoulder 74 at the opposite end engageable with a corresponding counterbored hole 76 in the other arm. The lockshaft 69 is received in a passage 78 in the body member 67 and has an enlarged portion 80 integral therewith adjacent the end part 70 and against which a spring 82, confined within the passage 78, operates to urge the lockshaft 69 to the left or locking position. The shaft 69 is provided with a handle 84 by which it can be moved to the right until the end part 70 and the shoulder are clear of their respective holes 72, 76 so that the entire body may be slid upwardly with respect to the arms 30, 32 to the position of FIG. 5. With the body member thus raised, the teeth 68 thereof are moved clear of the teeth 54 on the body part 10 and this member may then be moved freely in either direction with respect to the arms by rotation of the pinion as previously described.

To insure that the lock-shaft 69 will realign with the holes 72, 76 after rotation of the pinion, the hole 76 is desirably in slot form, as illustrated in FIG. 6, the arrangement permitting the lock-shaft to have vertical movement but no transverse movement thus insuring realignment of the shaft with the holes 72, 76.

In use, when it is desired to take up slack in the brake caused by wear, a suitable tool is engaged with one of the hexagonal heads of the pinion 24 and, in the case of the embodiment of the invention of FIGS. 1 through 3, the pinion is merely turned counterclockwise in FIG. 1 to cause the body part 10 and hence the camshaft 16 to rotate clockwise with respect to the arms 30, 32 and the teeth 54 of the body part to advance in ratchet fashion with respect to teeth 52 of the latching member 46 until slack has been removed whereupon the teeth 52, 54 interlock automatically without any further attention on the part of the operator. Once locked, braking force on the brake lever 38 is transmitted to the member 10 and to the camshaft 16 through the T-shaped end part 50 of the member 46 and the respective teeth 52, 54. No braking force is transmitted in any way through the agency of the pinion 24 whose sole function is merely to move the members of the adjuster relative to each other to effect changes in brake slackness. As shown in FIG. 3, the T-shaped end part 50 is substantially larger than the opposite end 48 because of the fact that the former must carry substantially the full braking force and must therefore be of relatively greater strength.

In the embodiment of FIGS. 4 through 6, operation is substantially identical as in the foregoing description, except that the locking shaft 69 must be retracted and the body member 67 moved bodily upwardly to disengage the teeth before slackness can be adjusted by rotation of the pinion.

It should be apparent from the foregoing description that the present invention has provided a simplified economical slack adjuster for brakes which is readily manufactured and easily operated for quick adjustment of brake slackness. It is of course susceptible of a wide variety of modifications and changes without however, departing from the scope and spirit of the appended claims.

What is claimed is:

1. A brake slack adjuster for a brake mechanism which includes a camshaft, said adjuster comprising a cylindrical body member connected to said shaft, an upstanding part integral with said body member, a brake lever comprising a pair of spaced arms embracing said upstanding part and rotatably connected to said body member, a first arcuate slot through said upstanding part, a pair of arcuate slots through said arms registrable with the slot through said upstanding part, a first set of gear teeth formed on said upstanding part and positioned on one side of said first arcuate slot, a second set of gear teeth formed on at least one of said arms and positioned on the opposite side of one of said pair of arcuate slots, said sets of gear teeth being opposed to each other, a pinion mutually engaging said sets of gear teeth, means for rotating said pinion in either direction to effect relative movement in opposite directions between said upstanding part and said lever, a series of locking teeth on the upper side of said upstanding part, a latching member slideably connected to said arms and having a series of locking teeth on its lower side engageable with the teeth on said upstanding part so as to lock said lever and upstanding part against relative movement, and means for moving said latching member in a direction away from the teeth on said upstanding part to enable said body member and hence said camshaft to be moved independently of said lever by rotation of said pinion to adjust slack in said brake.

2. The slack adjuster of claim 1 wherein the locking teeth of said latching member and said upstanding part are in ratchet form constructed and arranged to permit movement of the body and camshaft in a slack take-up direction relative to said lever but to prevent relative movement in the opposite direction, said latching member being resiliently urged in the direction of said upstanding member.

3. The slack adjuster of claim 1 including means for releasably retaining said latching member in a position wherein the teeth thereof are in engagement with the teeth of said upstanding part.

4. The slack adjuster of claim 3 wherein the means for retaining said latching member in the engaging position comprises a spring-load lock-shaft normally extending through aligned apertures in said lever and in said latch member, said lock-shaft being disengageable from one of said apertures so as to enable said member to be moved bodily in a direction away from said upstanding member.

5. The slack adjuster of claim 3 wherein the means for retaining said latching member in tooth engaging position comprises spring means acting on said latching member to urge said member towards its tooth-engaged position.

6. The slack adjuster of claim 1 including a tool engageable head on at least one end of said pinion for effecting rotation thereof.

References Cited in the file of this patent

UNITED STATES PATENTS

| | | |
|---|---|---|
| 58,478 | Reynolds | Oct. 2, 1866 |
| 246,169 | Manly | Aug. 23, 1881 |
| 939,903 | Gilbert | Nov. 9, 1909 |
| 954,515 | Henry | Apr. 12, 1910 |
| 1,308,363 | Kuehne et al. | July 1, 1919 |
| 1,681,968 | Anderson | Aug. 28, 1928 |
| 1,724,292 | Lawrence | Aug. 13, 1929 |
| 1,767,403 | Sauvage | June 24, 1930 |
| 2,379,796 | Freeman et al. | July 3, 1945 |
| 2,427,310 | Shumaker | Sept. 9, 1947 |
| 2,650,681 | Shively | Sept. 1, 1953 |
| 2,857,784 | Brailsford | Oct. 28, 1958 |
| 2,967,687 | Glusic | Jan. 10, 1961 |